United States Patent

Higuchi et al.

(10) Patent No.: US 7,682,528 B2
(45) Date of Patent: Mar. 23, 2010

(54) OXIDE ION CONDUCTOR

(75) Inventors: Yoshikatsu Higuchi, Niiza (JP);
Masayuki Sugawara, Asaka (JP);
Kagehisa Hamazaki, Kawagoe (JP);
Keizo Uematsu, Nagaoka (JP); Susumu Nakayama, Niihama (JP)

(73) Assignee: Honda Motor Co., Ltd., Tokyo (JP)

(*) Notice: Subject to any disclaimer, the term of this patent is extended or adjusted under 35 U.S.C. 154(b) by 693 days.

(21) Appl. No.: 11/522,869

(22) Filed: Sep. 18, 2006

(65) Prior Publication Data
US 2007/0015027 A1    Jan. 18, 2007

Related U.S. Application Data

(62) Division of application No. 10/779,052, filed on Feb. 12, 2004, now Pat. No. 7,128,995.

(30) Foreign Application Priority Data
Feb. 14, 2003   (JP)   .............................. 2003-037386

(51) Int. Cl.
H01B 1/08       (2006.01)
H01M 4/48       (2006.01)
H01M 8/00       (2006.01)
C04B 35/50      (2006.01)
C04B 35/00      (2006.01)

(52) U.S. Cl. ................ 252/519.1; 252/500; 252/518.1; 252/520.1; 252/521.3; 429/30; 429/33; 429/304; 423/593.1; 501/154

(58) Field of Classification Search ................ 252/500, 252/518.1, 519.1; 429/30, 33; 423/593.1
See application file for complete search history.

(56) References Cited

U.S. PATENT DOCUMENTS

2003/0180595 A1* 9/2003 Nakayama et al. ............ 429/33

FOREIGN PATENT DOCUMENTS

| EP | 1351326 A2 | | 10/2003 |
|----|---|---|---|
| JP | 5-157725 | | 6/1993 |
| JP | 08-208333 | | 8/1996 |
| JP | 08208333 | * | 8/1996 |
| JP | 11-130595 | | 5/1999 |
| JP | 11130595 | * | 5/1999 |
| JP | 2002-053367 | | 2/2002 |
| JP | 2002-193672 | | 7/2002 |
| JP | 2002193672 | * | 7/2002 |

(Continued)

OTHER PUBLICATIONS

Japanese Office Action for Application No. 2003-037386, dated Nov. 18, 2008.

*Primary Examiner*—Stanley Silverman
*Assistant Examiner*—Kallambella Vijayakumar
(74) *Attorney, Agent, or Firm*—Lahive & Cockfield, LLP; Anthony A. Laurentano; Brian C. Trinque

(57) ABSTRACT

An $La_2O_3$ powder and an $SiO_2$ powder are mixed with each other, and then heated. By heating, a porous material of $La_xSi_6O_{1.5X+12}$ ($8 \leq X \leq 10$) as a composite oxide is produced. Subsequently, the porous material is pulverized to obtain a powder, and the powder is added to a solvent to prepare a slurry. The slurry is solidified in a magnetic field to prepare a compact. After that, the compact is sintered, and an oxide ion conductor is obtained thereby.

8 Claims, 10 Drawing Sheets

CRYSTAL GRAIN

DIRECTION OF ARROW:
ORIENTATION OF c-AXIS

FOREIGN PATENT DOCUMENTS

| | | |
|---|---|---|
| JP | 2002-252005 | 9/2002 |
| JP | 2002025005 * | 9/2002 |
| JP | 2003-267800 | 9/2003 |

* cited by examiner

CRYSTAL GRAIN

DIRECTION OF ARROW:
ORIENTATION OF c-AXIS

CRYSTAL GRAIN

DIRECTION OF ARROW:
ORIENTATION OF c-AXIS

OXIDE ION CONDUCTOR

RELATED APPLICATIONS

This application is a divisional of U.S. application Ser. No. 10/779,052 filed Feb. 12, 2004, now U.S. Pat No. 7,128,995 which claims priority to Japanese application No. 2003-037386 filed Feb. 14, 2003.

BACKGROUND OF THE INVENTION

1. Field of the Invention

The present invention relates to an oxide ion conductor and a method of producing the same. In particular, the present invention relates to an oxide ion conductor which is composed of a composite oxide that exhibits anisotropy in relation to the oxide ion conductivity. The oxide ion conductor is preferably usable as a solid electrolyte of a fuel cell. The present invention also relates to a method of producing the oxide ion conductor.

2. Description of the Related Art

An oxide ion ($O^{2-}$) conductor is suggested as an electrolyte of the fuel cell. The fuel cell attracts the attention as a low pollution electric power supply source in response to the growing concern about the environment protection in recent years. When the oxide ion conductor is used, the entire fuel cell can be made of solid materials, because the oxide ion conductor is a solid. Therefore, the structure is simple. Further, it is possible to reduce the frequency of the maintenance operation because no liquid leakage occurs.

Thus, Japanese Laid-Open Patent Publication Nos. 8-208333 and 11-130595 suggest oxide ion conductors composed of a composite oxide of a rare earth element and Si. On the other hand, the present applicant has suggested, in Japanese Laid-Open Patent Publication No. 2002-252005, an oxide ion conductor which is composed of a composite oxide of a rare earth element and Ge and which can be manufactured at a low temperature as compared with the oxide ion conductors as described above. The oxide ion conductor as described above is manufactured by sintering a powder of the oxide of the rare earth element and a powder of silicon oxide or germanium oxide. The oxide ion conductor obtained in this way is the composite oxide, and the crystalline structure thereof is an apatite type structure.

It is preferable that the oxide ion conductor of this type is excellent in oxide ion conductivity. However, it is not easy to remarkably improve the oxide ion conduction. In particular, when it is intended to manufacture single crystals by a method described in Japanese Laid-Open Patent Publication No. 11-130595, a shape of the single crystal is specified to certain ones. Further, it is necessary to melt the material. Therefore, the oxide ion conductor, which is finally obtained, has a narrow composition range.

The present inventors note the mechanism of the oxide ion conduction in the composite oxide during the study for improving the oxide ion conductivity of the composite oxide having the apatite type structure.

The crystal system of the substance having the apatite type structure usually belongs to the hexagonal system. In this case, the oxide ion conduction is caused by the movement of an oxide ion ($O^{2-}$) present at the 2a site. Accordingly, it can be assumed that the oxide ion conductivity, which is obtained in the movement direction, may be improved if the directions of the movement of $O^{2-}$ are approximately coincident with each other in the respective crystal grains by aligning the directions of orientation of the crystal grains of the composite oxide. In other words, it is considered that anisotropy is brought about in the directions of orientation of the crystals and consequently in the oxide ion conductivity so that ions are moved in the direction in which the oxide ion conductivity is high. However, an oxide ion conductor having the apatite type structure has not been found, in which the directions of orientation of the crystals are approximately coincident with each other. Also, the method of producing such an oxide ion conductor has not been found.

Each of Japanese Laid-Open Patent Publication Nos. 2002-53367 and 2002-193672 suggests a ceramic sintered product having anisotropy and a method of producing the same. A powder is dispersed in a solvent to prepare a slurry, and then the slurry is solidified in a magnetic field to obtain a compact which is thereafter sintered. However, such a technique is used to improve the mechanical characteristics such as strength and toughness in a specified direction, which is not directed to the improvement in the oxide ion conductivity in a specified direction of a composite oxide having the apatite type structure or the like.

SUMMARY OF THE INVENTION

The present inventors have studied the improvement in oxide ion conductivity. As a result, the present inventors have found out that the directions of orientation of crystals can be approximately aligned.

A principal object of the present invention is to provide an oxide ion conductor and a method of producing the same. The oxide ion conductor has anisotropy in relation to a movement direction of oxide ion because of the approximate coincidence of orientations of crystal grains. The oxide ion conductor is extremely excellent in oxide ion conductivity in a specified direction.

According to a first aspect of the present invention, there is provided an oxide ion conductor in which oxide ion conductivity is shown in a direction of conduction or on a plane of conduction for moving oxide ion in a crystal, wherein the oxide ion conductor has anisotropy in the oxide ion conductivity.

In the oxide ion conductor having the anisotropy in the oxide ion conductivity, the oxide ion conductivity is extremely increased in the direction or in the plane in which the oxide ion is easily movable. In other words, the satisfactory oxide ion conductor is provided. Therefore, the oxide ion conductor is preferably usable as a conductor for which large oxide ion conductivity is required, for example, in an electrolyte of a solid oxide fuel cell.

Preferred examples of the oxide ion conductor as described above may include a composite oxide which has constituent elements of a trivalent element A, a tetravalent element B, and oxygen O, the composite oxide has a composition formula represented by $A_X B_6 O_{1.5X+12}$ provided that $8 \leqq X \leqq 10$, the composite oxide has an apatite type crystalline structure, and the oxide ion conductor has anisotropy in the oxide ion conductivity.

In the oxide ion conductor, the orientation of each crystal of the oxide ion conductor is approximately a specified direction. In other words, the orientations of the crystals are approximately aligned. Therefore, the directions, in which $O^{2-}$ is moved in the crystals, are approximately coincident with each other. Accordingly, the oxide ion conductivity is improved in the movement direction.

It is preferable that the crystal system of the composite oxide has a hexagonal system, and the direction of crystals is oriented in a c-axis.

In general, it is considered that the oxide ion conduction is provided as $O^{2-}$ is moved along the c-axis in the apatite type structure belonging to the hexagonal system. Therefore, when the crystals are oriented in the c-axis direction, it is possible to provide the oxide ion conductor which is extremely excellent in the oxide ion conductivity in the c-axis direction in which $O^{2-}$ is considered to be moved.

It is especially preferable that the crystal system belongs to the hexagonal system, and a space group of the crystal is expressed as $P6_3/m$ by a Hermann-Mauguin's symbol. When the crystal system as described above is formed, the oxide ion conductivity is increased maximally.

Preferred examples of the element A may include a rare earth element. La is especially preferred. On the other hand, preferred examples of the element B may include Si and Ge.

Other preferred examples of the oxide ion conductor in which the conduction direction or the conduction plane for moving the oxide ion exists in the crystal may include layered perovskite compounds and a series of oxide ion conductors referred to as "BIMEVOX" having a basic composition of $Bi_4V_2O_{11}$. The oxide ion conductor according to the present invention also includes the compounds as described above provided that the compounds have the anisotropy in the oxide ion conductivity.

According to a second aspect of the present invention, there is provided a method of producing an oxide ion conductor comprising a composite oxide which has constituent elements of a trivalent element A, a tetravalent element B, and oxygen O, the composite oxide has a composition formula represented by $A_XB_6O_{1.5X+12}$ provided that $8 \leq X \leq 10$, the composite oxide has an apatite type crystalline structure, the oxide ion conductor has anisotropy in oxide ion conductivity, the method of producing the oxide ion conductor comprising:

a first step of mixing a powder of a substance having constituent elements of the element A and oxygen O with a powder of a substance having constituent elements of the element B and oxygen O in a ratio to produce $A_XB_6O_{1.5X+12}$ provided that $8 \leq X \leq 10$, for obtaining a mixed powder;

a second step of heating the mixed powder for preparing the composite oxide having the composition formula represented by $A_XB_6O_{1.5X+12}$ provided that $8 \leq X \leq 10$;

a third step of adding the composite oxide to a solvent for preparing a slurry, and then solidifying the slurry in a magnetic field for preparing a compact; and a fourth step of sintering the compact for preparing the oxide ion conductor of the composite oxide.

When the slurry is arranged in the magnetic field, the crystal grains of the composite oxide contained in the slurry are approximately oriented. Accordingly, the compact is obtained, in which the crystal grains are approximately oriented in a specified direction. Consequently, it is possible to obtain the sintered product which exhibits the anisotropy in the oxide ion conductivity.

It is preferable that a temperature of heating in the second step is 700° to 1200° C. If the temperature is less than 700° C., the heating is not sufficient. On the other hand, if the temperature exceeds 1200° C., the grain growth is excessively advanced, and a relatively dense sintered product may be obtained. In such a case, it is not easy to prepare the slurry in the next third step.

It is preferable that a temperature of sintering in the fourth step is 1400° to 1800° C. As described above, according to the present invention, the sintering temperature can be not more than 1800° C. Therefore, it is possible to realize a long service life of a reaction furnace and prevent decomposition of the oxide ion conductor. In particular, when Ge is selected as the element B, the sintering temperature can be a relatively low temperature, i.e., about 1500° C. Thus, it is possible to reduce the production cost of the oxide ion conductor. If the temperature is less than 1400° C., the grain growth is not advanced efficiently.

Preferred examples of the substance having the constituent elements of the element A and oxygen O may include rare earth compounds, especially lanthanum compounds such as lanthanum oxide ($La_2O_3$), lanthanum hydroxide ($La(OH)_3$), and lanthanum carbonate ($La_2CO_3$). Among them, lanthanum oxide is most preferred.

On the other hand, preferred examples of the substance having the constituent elements of the element B and oxygen O may include silicon oxide and germanium oxide.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The oxide ion conductor of the present invention and the method of producing the same will be explained in detail below with reference to the accompanying drawings as exemplified by preferred embodiments.

Figure 1:
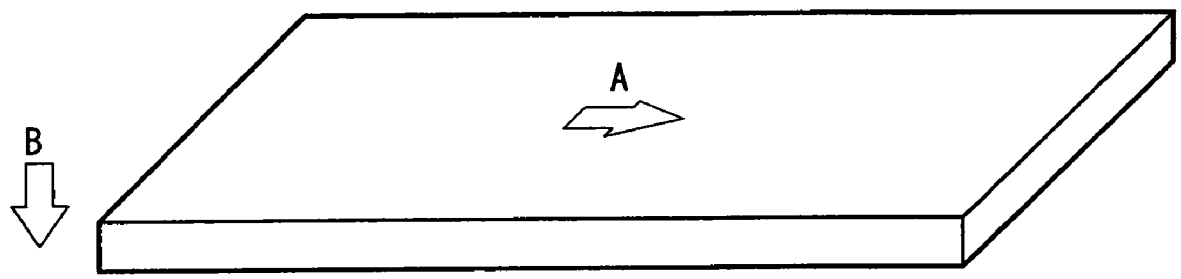
FIG. 1 is a schematic perspective view illustrating an entire oxide ion conductor according to an embodiment of the present invention.

An oxide ion conductor according to an embodiment of the present invention is shown in FIG. 1. The oxide ion conductor 10 is a sheet-like sintered product composed of a composite oxide having the element A and the element B. The composition formula thereof is represented by $A_xB_6O_{1.5X+12}$.

In this formula, X is within a range of not less than 8 and not more than 10. If X is less than 8, it may be difficult for the crystalline structure to form the apatite type structure. In other cases, any impurity phase such as $La_2Si_2O_7$ may be contained. On the other hand, if X exceeds 10, any impurity phase such as $La_2SiO_5$ may be contained. In any case, the oxide ion conductivity may be lowered.

A trivalent element is selected for the element A, and a tetravalent element is selected for the element B. In particular, when X is not less than 8 and not more than 10, then the apatite type structure is formed, and the excellent oxide ion conductivity is obtained. Therefore, a rare earth element, especially La is preferred for the element A, and Si or Ge is preferred for the element B. The range of X is more preferably not less than 9 and not more than 10. On this condition, it is possible to reliably obtain the crystals having the apatite type structure. When Ge is selected for the element B, it is preferable that X is not less than 8 and less than 10.

The most preferable value of X is 9.33. In this case, the crystals form the apatite type structure (see FIG. 2), and an impurity phase having any other structure is scarcely observed. That is, the oxide ion conductivity is maximized.

Figure 2:
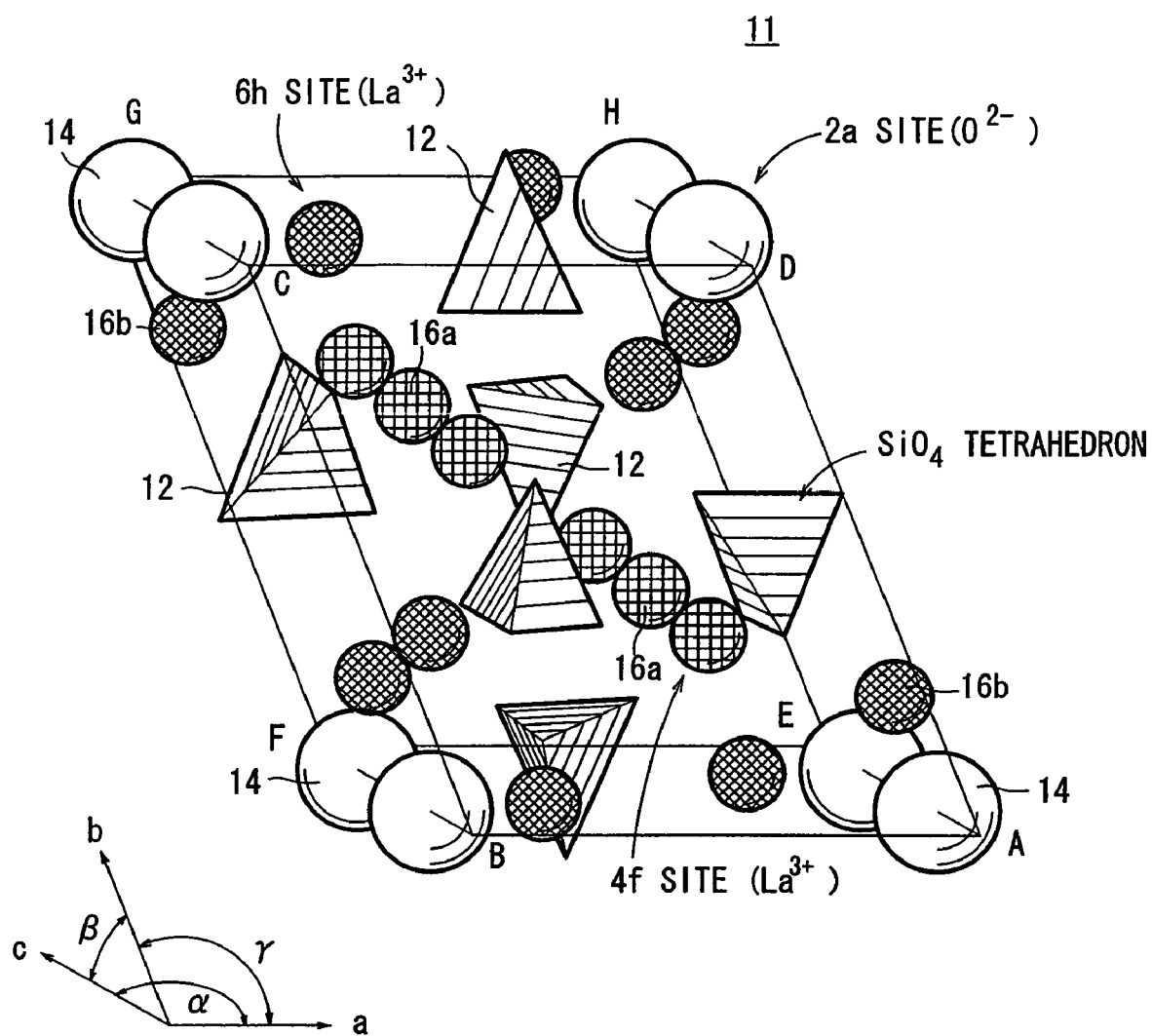
FIG. 2 shows a schematic structure of a unit lattice of $La_XSi_6O_{1.5X+12}$ ($8 \leq X \leq 10$) of the oxide ion conductor shown in FIG. 1.

FIG. 2 shows the structure of the unit lattice of $La_xSi_6O_{1.5X+12}$ ($8 \leq X \leq 10$) as the composite oxide as viewed in the c-axis direction. The unit lattice 11 has the apatite type structure including six $SiO_4$ tetrahedrons 12, $O^{2-}$ 14 occupying the 2a sites, and $La^{3+}$ 16a, 16b occupying the 4f sites or the 6h sites, respectively. $Si^{4+}$ and $O^{2-}$ of the $SiO_4$ tetrahedron 12 are not shown.

The crystal system of the unit lattice 11 belongs to the hexagonal system. That is, in FIG. 2, the angle $\alpha$ at which the edge AB in the a-axis direction and the edge BF in the c-axis direction of the unit lattice 11 intersect with each other, the angle $\beta$ at which the edge BC in the b-axis direction and the edge BF intersect with each other, and the angle $\gamma$ at which the edge AB and the edge BC intersect with each other are 90°, 90°, and 120°, respectively. The length of the edge AB is equal to the length of the edge BC. Further, the length of the edges AB, BC is longer than the length of the edge BF.

In the hexagonal system lattice, when the lattice is rotated by ⅓ turn about the center of the virtual screw axis (not shown) and is translated by ½ of the length of the edge BF along the screw axis, the positions of the respective ions are coincident with each other before and after the operation. Further, the mirror plane of the hexagonal system lattice is perpendicular to the screw axis. That is, the space group of the crystal of $La_xSi_6O_{1.5X+12}$ ($8 \leq X \leq 10$) is expressed as $P6_3/m$ according to a Hermann-Mauguin's symbol.

The oxide ion conductor 10 according to the embodiment of the present invention is the sintered product in which crystal grains having the crystalline structure as described above are sintered with each other, in which the c-axis is oriented in the direction of the arrow B. Therefore, the oxide ion conductivity in the direction of the arrow B (thickness) is higher than the oxide ion conductivity in the direction of the arrow A shown in FIG. 1 in the oxide ion conductor 10. That is, the oxide ion conductor 10 has the anisotropy in relation to the oxide ion conductivity.

It is considered that the reason, why the anisotropy occurs in the oxide ion conductivity of the oxide ion conductor 10, is as follows.

$O^{2-}$ 14, which occupies the 2a sites in $La_xSi_6O_{1.5X+12}$ ($8 \leq X \leq 10$) having the apatite type structure shown in FIG. 2, does not participate so much in the bonding with respect to the $SiO_4$ tetrahedrons 12 or $La^{3+}$ 16a. Accordingly, the force, which acts on $O^{2-}$ 14, is not strong. Therefore, it is expected that $O^{2-}$ 14 can be moved relatively freely in the c-axis direction without being restricted by the 2a sites. It is considered that the oxide ion conduction is caused by the movement of the oxide ion based on the mechanism as described above.

When samples are actually cut out from a portion extending in the parallel direction along the c-axis and a portion extending in the direction perpendicular to the c-axis from a single crystal manufactured by the Bernoulli method, the Czochralski method (respective samples will be hereinafter referred to as "c-axis-parallel material" and "c-axis-perpendicular material") or the like, and electric characteristics are investigated for the c-axis-parallel material and the c-axis-perpendicular material, the c-axis-parallel material is superior.

Figure 3:
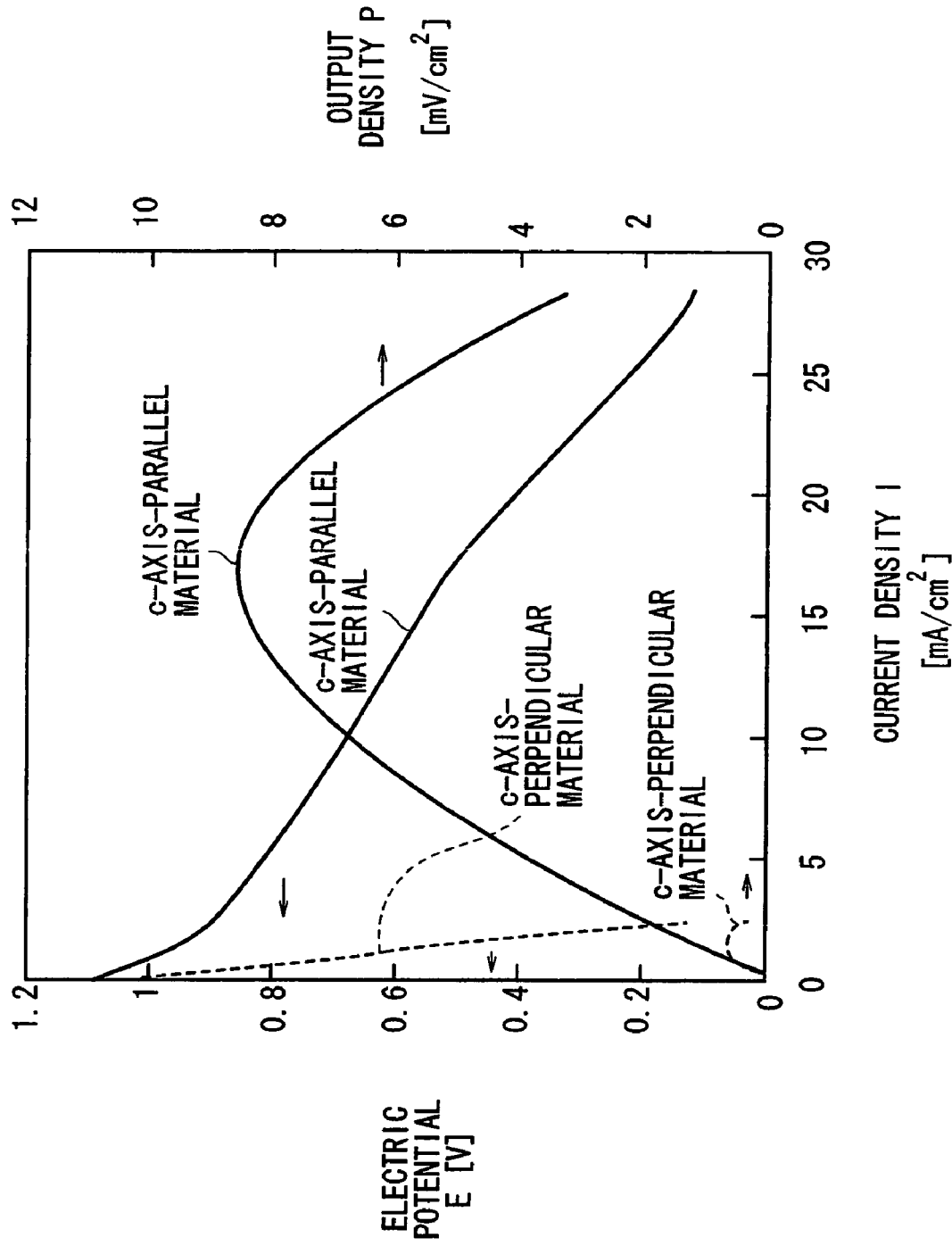
FIG. 3 shows a graph illustrating relationships between the current density, the output density and the electric potential at 700° C. in relation to a c-axis-parallel material and a c-axis-perpendicular material.
Figure 4:
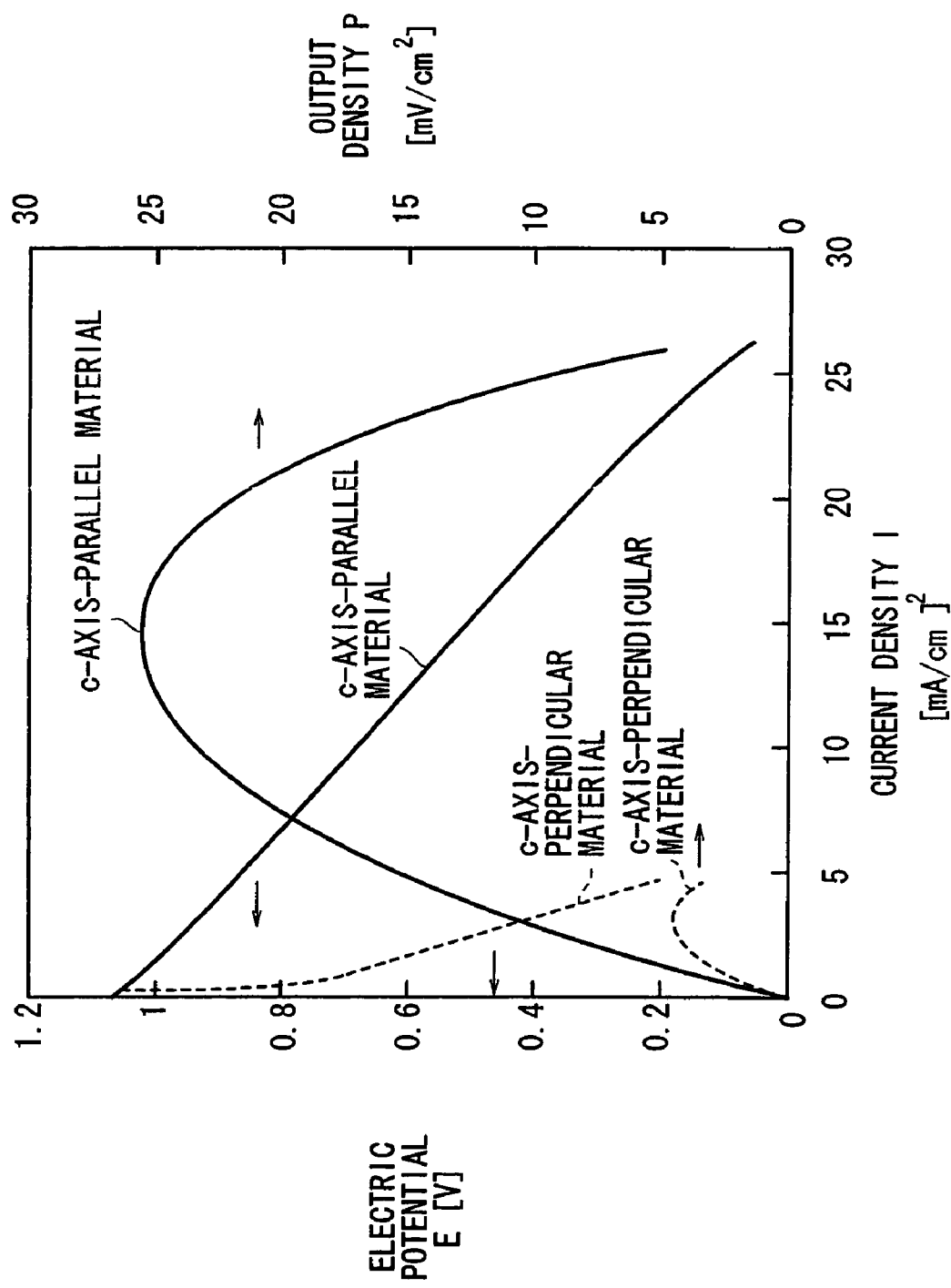
FIG. 4 shows a graph illustrating relationships between the current density, the output density and the electric potential at 800° C. in relation to the c-axis-parallel material and the c-axis-perpendicular material.

Specifically, when fuel cells are produced by using the c-axis-parallel material and the c-axis-perpendicular material as an electrolyte, and when the output density with respect to the current density is measured at 700° C. or 800° C. for the c-axis-parallel material and the c-axis-perpendicular material, the output density of the c-axis-parallel material is extremely larger than that of the c-axis-perpendicular material in any case as shown in FIGS. 3 and 4.

When the electric potential with respect to the current density is measured, a high electric potential is obtained for the c-axis-parallel material even when the current density is large as shown in FIGS. 3 and 4 as well. This means the fact that high voltage is obtained, for example, when the c-axis-parallel material is used as an electrolyte of a fuel cell and the fuel cell is subjected to electric discharge at a large current density.

However, when the single crystal is manufactured by the Bernoulli method, the Czochralski method or the like, it is difficult to manufacture products having shapes other than columnar shapes, and it is difficult to manufacture a large crystal. Further, only the oxide ion conductor, in which the composition range is relatively narrow, can be obtained, because the material is melted. In particular, when the oxide ion conductor, which contains Ge as the element B, is manufactured, the composition of Ge is changed during the melting, because the melted matter has a high vapor pressure. For this reason, it is difficult to manufacture the single crystal.

Figure 5:
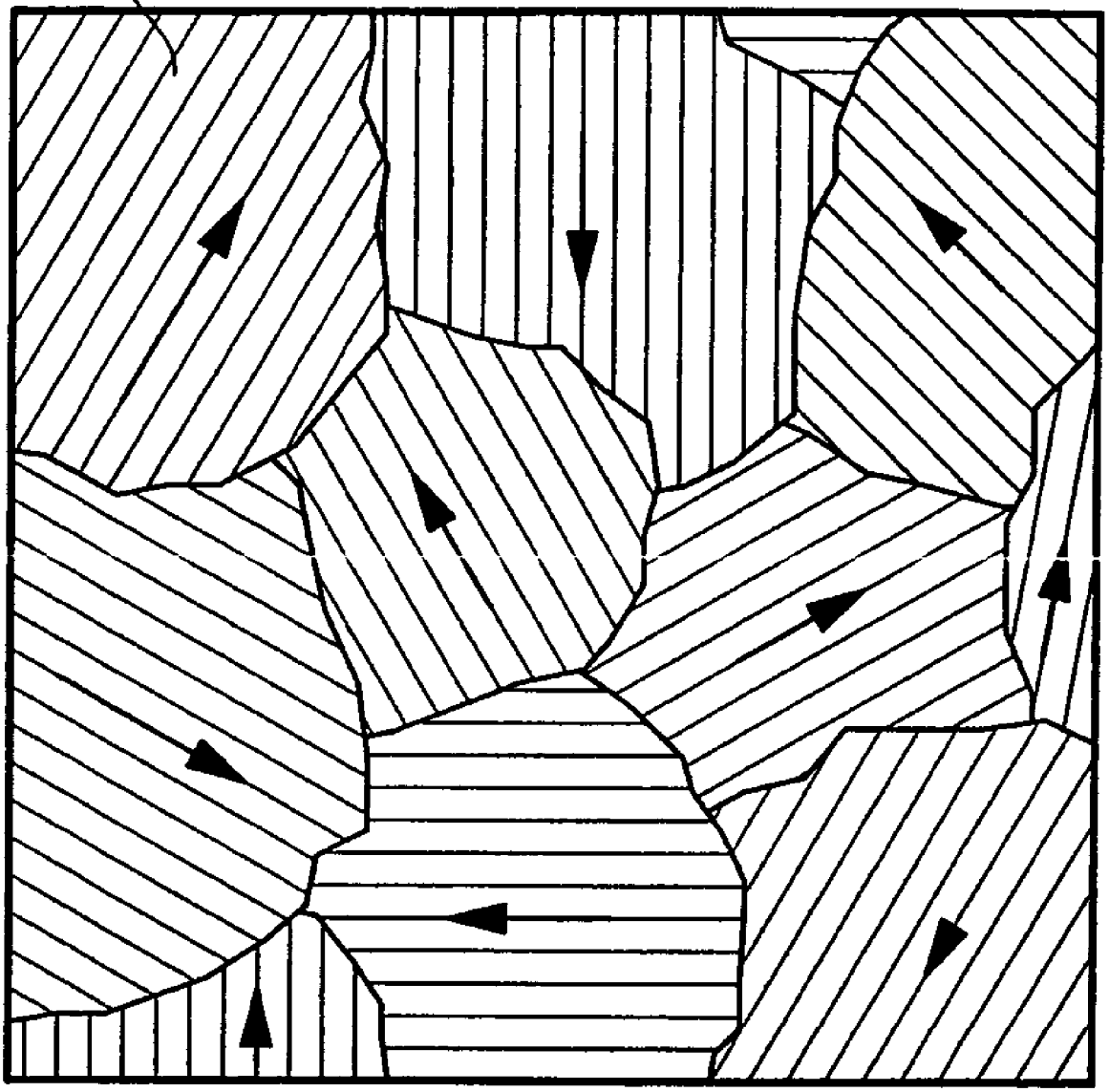
FIG. 5 is an illustrative view of a magnified major part illustrating the c-axis directions of respective crystals in a general oxide ion conductor.

In the case of a general sintered product, as shown in FIG. 5, the orientation of the c-axis, in other words, the orientation of the crystal grains is irregular. Therefore, the oxide ion conductivity of such a sintered product exhibits the isotropy.

Figure 6:
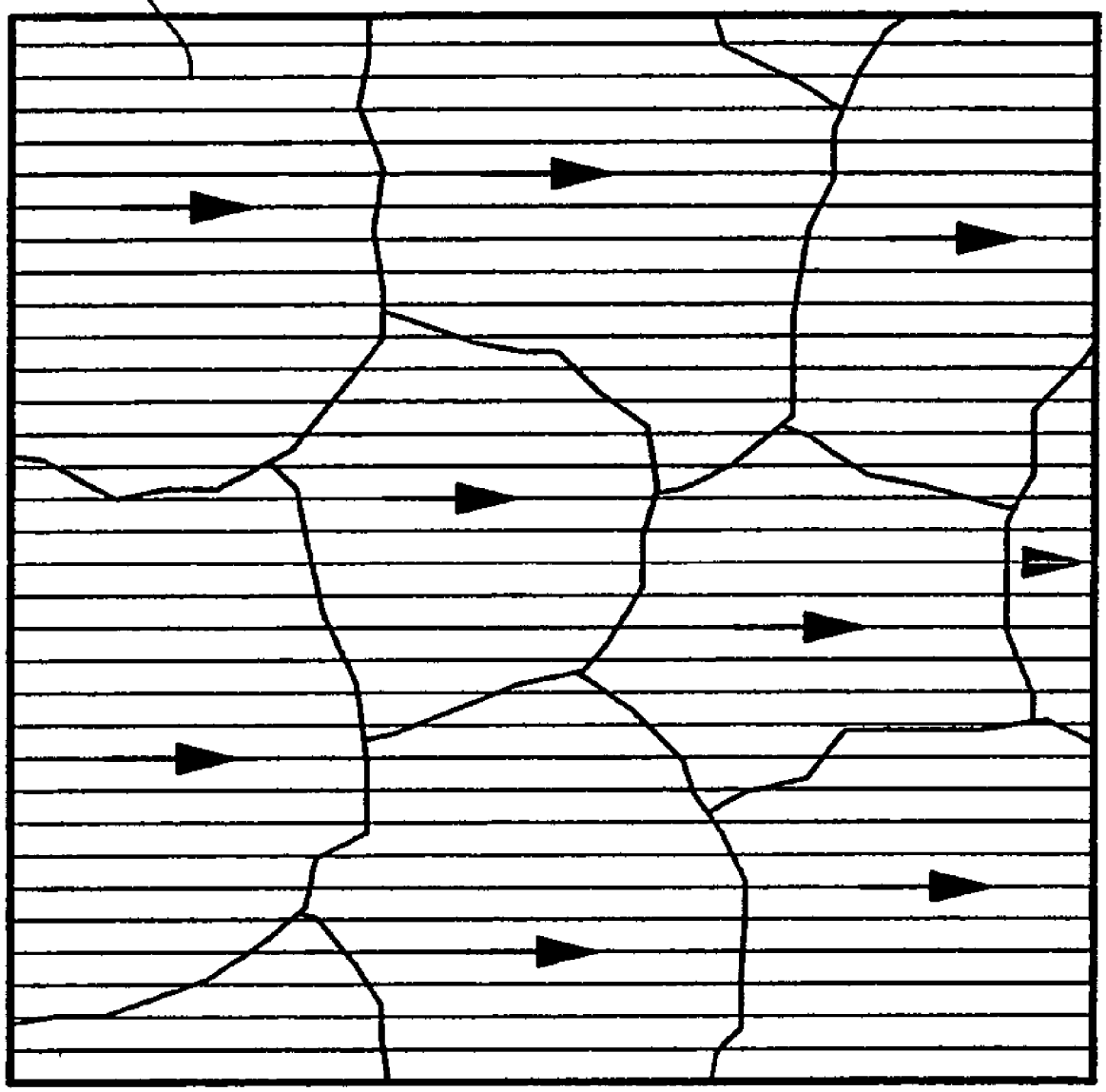
FIG. 6 is an illustrative view of a magnified major part illustrating the c-axis directions of respective crystals in the oxide ion conductor shown in FIG. 1.

In contrast, in the case of the oxide ion conductor 10 according to the embodiment of the present invention, as shown in FIG. 6, the c-axis of the respective crystal grains is approximately directed in the same direction. That is, the orientations of the crystal grains are approximately aligned. Accordingly, the direction of movement of the oxide ions along the c-axis is aligned in each of the crystal grains. Therefore, the oxide ion conductivity is extremely large in the direction along the c-axis (direction of the arrow B shown in FIG. 1). On the other hand, the movement of the oxide ion is scarcely caused in the directions other than the direction parallel to the c-axis. Therefore, the oxide ion conductivity is low in the directions other than the direction parallel to the c-axis. It is considered that the anisotropy is consequently generated in the oxide ion conductivity.

As described above, the oxide ion conductor according to the embodiment of the present invention exhibits the excellent oxide ion conductivity in the direction along the c-axis. Therefore, as compared with a conventional fuel cell which has a conventional oxide ion conductor, a fuel cell which uses the oxide ion conductor according to the embodiment of the present invention as a solid electrolyte shows equivalent power generation characteristics even when the operation is performed at a low temperature. Therefore, it is possible to reduce the operation cost of the fuel cell.

The oxide ion conductor 10, in which the crystal grains are approximately oriented in the specified direction, can be produced as follows.

Figure 7:
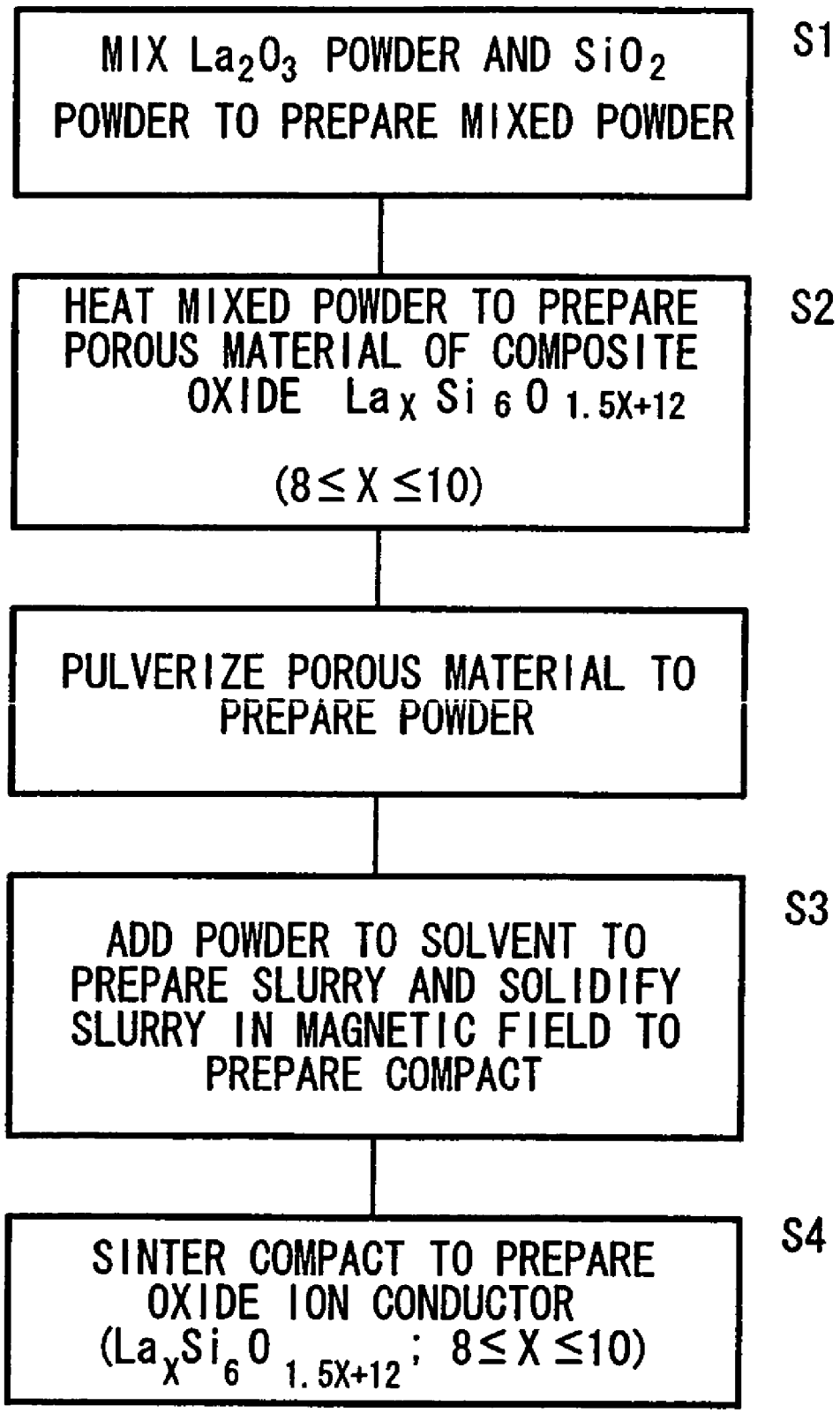
FIG. 7 shows a flow chart illustrating a method of producing the oxide ion conductor according to an embodiment of the present invention.

A method of producing the oxide ion conductor 10 according to the embodiment of the present invention will be explained with reference to a flow chart of FIG. 7. In this example, $La_XSi_6O_{1.5X+12}$ is produced while selecting La as the element A and selecting Si as the element B. This production method comprises a first step S1 of mixing a lanthanum oxide powder and a silicon oxide powder to prepare a mixed powder, a second step S2 of applying a heat treatment to the mixed powder, a third step S3 of adding a composite oxide produced by the heat treatment to a solvent to prepare a slurry and solidifying the slurry in a magnetic field to prepare a compact, and a fourth step S4 of sintering the compact to prepare a sintered product (oxide ion conductor).

In the first step S1, the lanthanum oxide ($La_2O_3$) powder and the silicon oxide ($SiO_2$) powder are mixed with each other.

In this step, the ratio between the $La_2O_3$ powder and the $SiO_2$ powder is set so that the crystal of $La_XSi_6O_{1.5X+12}$ as a final product has the apatite type structure, in other words, the value of X is not less than 8 and not more than 10. For example, to obtain a composite oxide having a composition represented by $La_{9.33}Si_6O_{26}$, the ratio $La_2O_3$ powder:$SiO_2$ powder=4.22:1 (numerals are indicated by weight ratios).

When the powders are mixed, a known technique such as a wet ball mill method may be adopted while adding ethanol or the like.

Subsequently, in the second step S2, the mixed powder is heat-treated. $La_2O_3$ and $SiO_2$ are reacted with each other in accordance with the heat treatment. Accordingly, $La_XSi_6O_{1.5X+12}$ ($8 \leq X \leq 10$) as the composite oxide is produced.

During this process, the heat treatment is conducted at a temperature at which the grain growth of $La_XSi_6O_{1.5X+12}$ is not excessively advanced and a porous material, which is easily pulverized under pressure, can be obtained. Specifically, it is preferable that the temperature is 700° to 1200° C. The heat treatment time may be, for example, about 2 hours.

The obtained porous material as described above is pulverized to prepare a powder. Subsequently, the compact is manufactured by using the powder in the third step S3.

The powder is added to the solvent to prepare the slurry. An example of the solvent is ethanol. The amount of the solvent may be an amount so that the ratio of the powder is about 40% by volume. A dispersing agent such as SN Dispersant 9228 (trade name of the product by San Nopco Limited) may be further added to the slurry. It is sufficient to add the dispersing agent thereto about 2.5% by volume.

It is preferable that the wet ball mill method is applied to the slurry. Accordingly, the grain sizes of powder may be further decreased, and grain growth is promoted in the powder during the sintering. Further, the powder is dispersed substantially uniformly in the slurry. Therefore, it is possible to obtain a dense and strong sintered product.

Subsequently, the slurry is formed to a sheet-shaped. That is, a predetermined amount of the slurry is put into a rectangular frame. In the embodiment of the present invention, the slurry is settled in the magnetic field together with the frame.

As shown in FIG. 2, in the crystal having the apatite type structure, the length of the edge AB (in the a-axis direction) is equal to the length of the edge BC (in the b-axis direction), and the edges AB, BC are longer than the edge BF (in the c-axis direction). Therefore, it is expected that the magnetic susceptibilities in the a-axis direction and in the b-axis direction are different from the magnetic susceptibility in the c-axis direction.

Therefore, each crystal grain is approximately oriented in the magnetic field so that the c-axis direction is parallel or perpendicular to the direction of lines of magnetic force. As a result, the compact is obtained, in which each crystal grain is approximately oriented in the specified direction.

The intensity of the magnetic field may be about 10 T (tesla). The slurry may be left until the slurry is solidified to form a compact. In the slurry in which the ratio of the powder is 40% by volume, the slurry is solidified in about 6 hours to form the compact.

Subsequently, in the fourth step S4, the grain of $La_XSi_6O_{1.5X+12}$ powder grows by sintering the compact. That is, the joined portions of the grains grows, at which the grains contact each other, and the grains are finally jointed to one another to form large grains. Accordingly, the oxide ion conductor 10 as the sintered product (see FIG. 1) is consequently obtained.

It is preferable that the sintering temperature is 1400° to 1800° C. If the sintering temperature is less than 1400° C., the grain growth is not advanced efficiently. On the other hand, if the temperature exceeds 1800° C., the sintered product does not have a desired composition or the apatite type structure by thermal decomposition in sintering. Thus, the oxide ion conductivity is undesirably lowered. When Si is selected for the element B, the sintering temperature is more preferably 1450° to 1700° C., and the sintering temperature is much more preferably 1700° C. When Ge is used for the element B, the sintering temperature of 1500° C. is preferable.

As described above, in the production method according to the embodiment of the present invention, it is possible to lower the sintering temperature. Therefore, it is possible to realize a long service life of the reaction furnace. Further, it is also possible to reduce the production cost.

The sintering time is chosen as only a period of time in which the dense sintered product (oxide ion conductor 10) is obtained. For example, when the sintering temperature is 1500° C., the temperature is maintained for about 6 hours.

Figure 8:
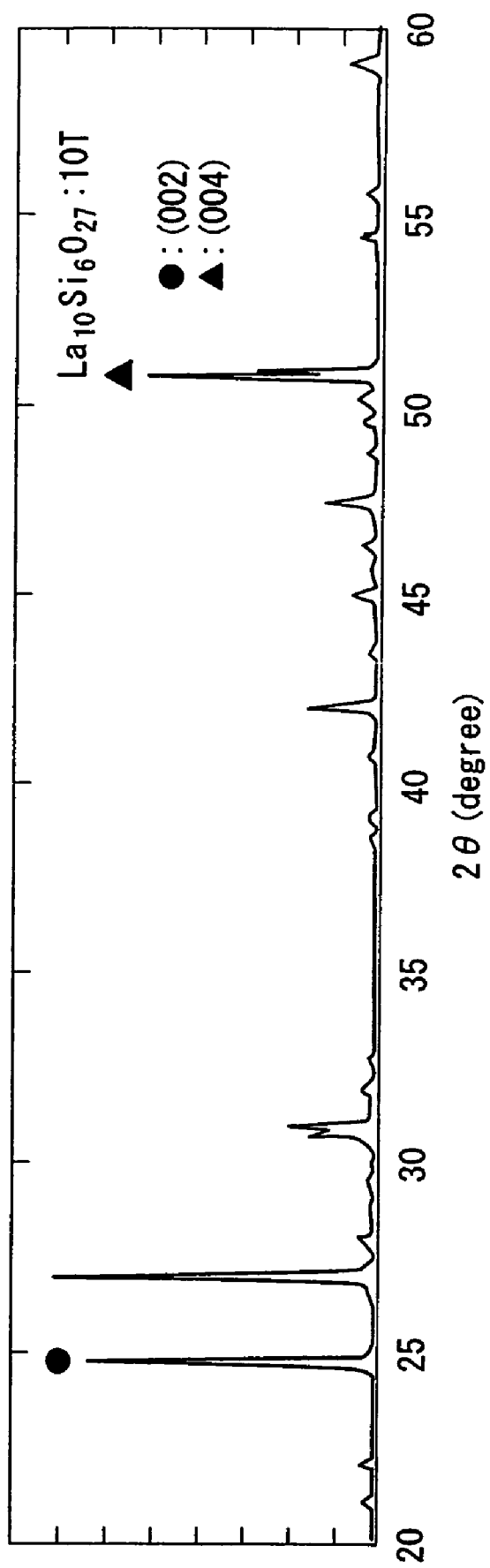
FIG. 8 shows an X-ray diffraction measurement profile of the oxide ion conductor (measured in the c-axis direction) according to the embodiment of the present invention in which a compact was manufactured in the presence of a magnetic field.
Figure 9:
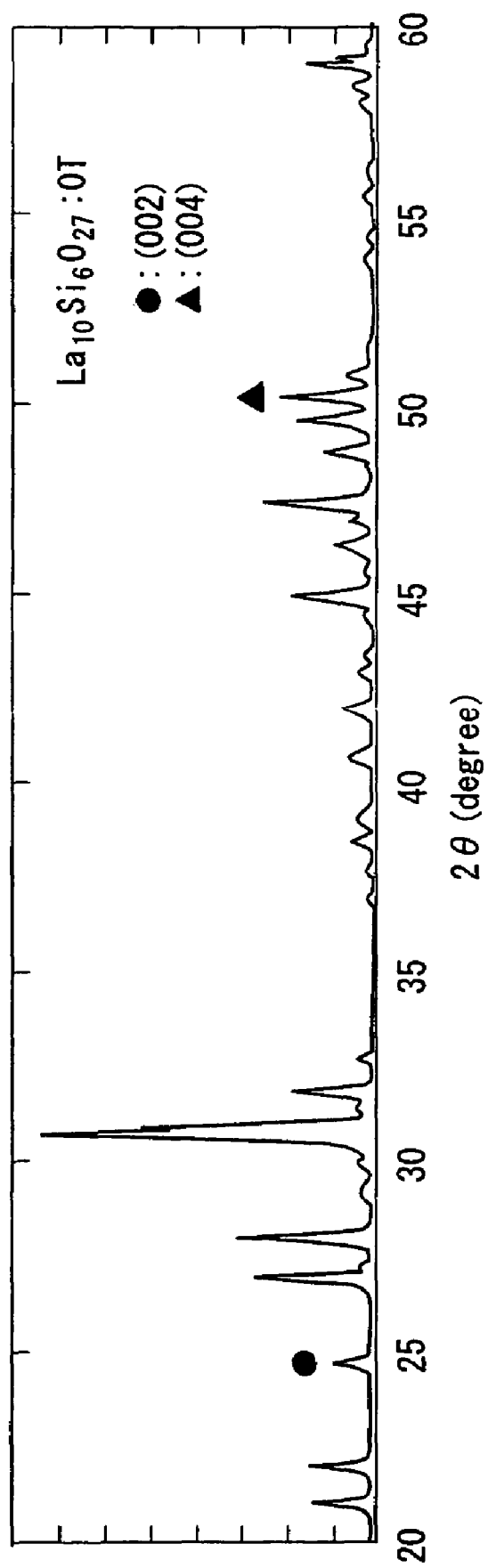
FIG. 9 shows an X-ray diffraction measurement profile of a conventional oxide ion conductor in which a compact was manufactured without any magnetic field.

FIG. 8 shows an X-ray diffraction measurement profile of the oxide ion conductor 10 (having the composition of $La_{10}Si_6O_{27}$) obtained by the production method as described above. The oxide ion conductor 10 is measured in the c-axis direction. FIG. 9 shows an X-ray diffraction measurement profile of $La_{10}Si_6O_{27}$ produced in accordance with this production method except that a compact was manufactured in no magnetic field. When the respective peak intensities on the (002) and (004) planes in FIGS. 8 and 9 are compared with each other, both peaks in FIG. 8 are extremely high. According to this fact, it is clear that the crystal grains can be oriented in the c-axis direction by manufacturing the compact in the magnetic field.

The degree of orientation of the oxide ion conductor 10 can be calculated according to the Lotgering expression as represented by the expression (1).

$$f = \frac{\rho - \rho_0}{1 - \rho_o} \quad (1)$$

In the expression (1), $\rho_0$ represents the ratio between the total intensity of the peaks appeared in the range of the diffraction angle (2θ) of 20° to 60° and the intensity of both peaks on the (002) and (004) planes in relation to the oxide ion conductor produced in no magnetic field, which is determined by the expression (2).

$$\rho_0 = \frac{\sum I_0(00\ell)}{\sum I_0(hk\ell)} \quad (2)$$

In the expression (2), $\Sigma I_0(hkl)$ represents the total intensity of the peaks appeared in the range of 20° to 60°, and $\Sigma I_0(001)$ represents the intensity of both peaks based on the (002) and (004) planes.

On the other hand, $\rho$ in the expression (1) represents the ratio between the total intensity of the peaks appeared in the range of the diffraction angle (2θ) of 20° to 60° and the intensity of both peaks on the (002) and (004) planes in relation to the oxide ion conductor 10 produced in the magnetic field, which is determined by the expression (3).

$$\rho = \frac{\sum I(00\ell)}{\sum I(hk\ell)} \quad (3)$$

In the expression (3), $\Sigma I(hkl)$ and $\Sigma I(001)$ represent the total intensity of the peaks appeared in the range of 20° to 60° and the intensity of both peaks on the (002) and (004) planes in the same manner as in the expression (2).

For example, when $\Sigma I_0(hkl)$ and $\Sigma I_0(001)$ are determined with reference to FIG. 9, $\rho_0$ is 0.057. Similarly, when $\Sigma I(hkl)$ and $\Sigma I(001)$ are determined according to FIG. 8, $\rho$ is 0.452. When the variables in expression (1) are substituted with these values, the degree of orientation f of the oxide ion conductor 10 ($La_{10}Si_6O_{27}$) having the X-ray diffraction measurement profile shown in FIG. 8 is 41.9%.

As described above, according to the production method of the embodiment of the present invention, it is possible to obtain the oxide ion conductor 10 in which the c-axis of the crystal grains is approximately oriented in the specified direction. Therefore, the anisotropy arises in the oxide ion conductivity in the oxide ion conductor 10. The extremely excellent oxide ion conductivity is shown in the direction of the arrow B shown in FIG. 1.

Further, the oxide ion conductor 10 obtained as described above has the apatite type structure in which the crystal belongs to the hexagonal system and the space is expressed as $P6_3/m$. Therefore, the excellent oxide ion conductivity is exhibited.

Figure 10:
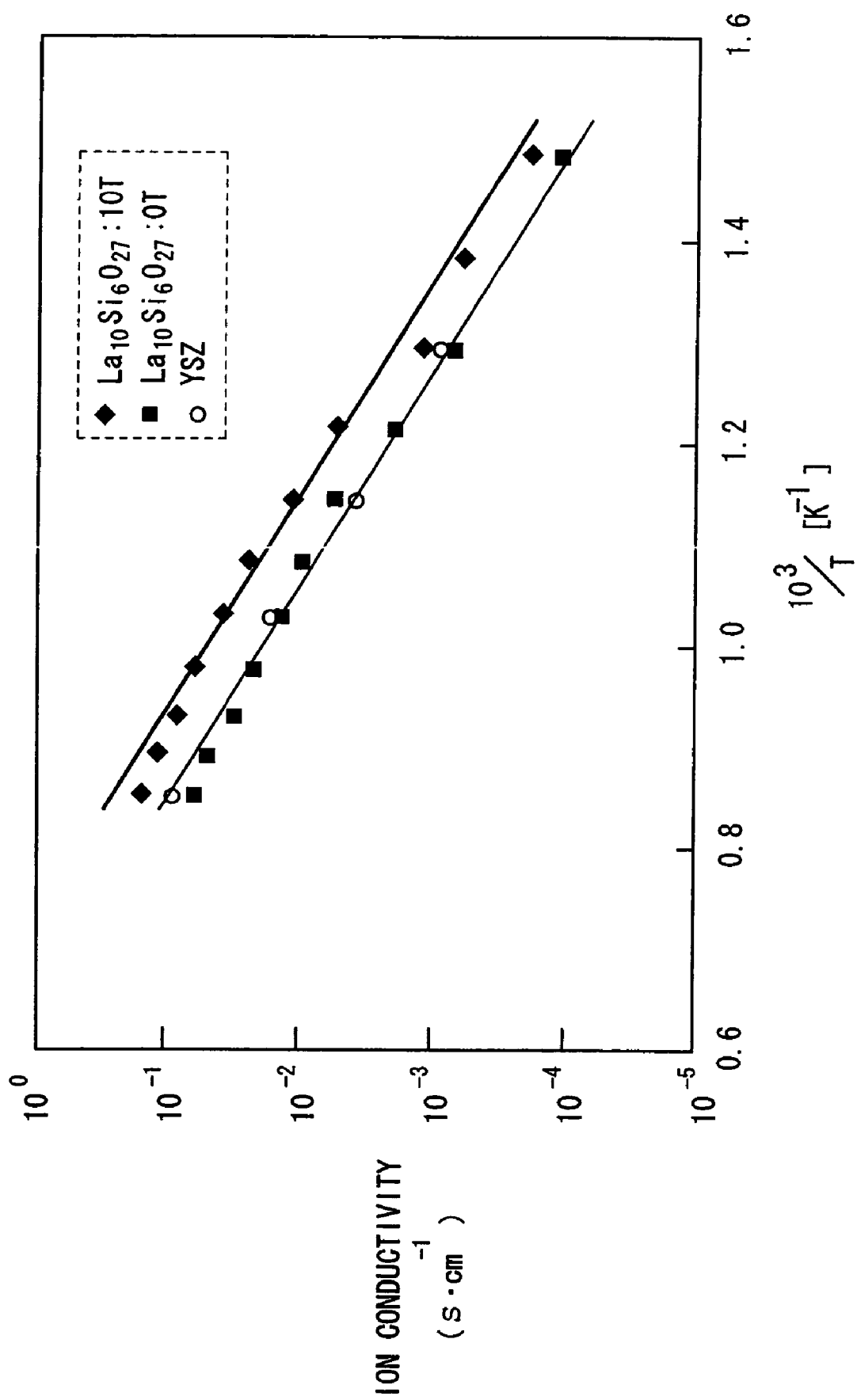
FIG. 10 shows a graph illustrating comparison of ion conductivities of the oxide ion conductor in the c-axis direction shown in FIG. 8, the oxide ion conductor shown in FIG. 9, and yttria-stabilized zirconia (YSZ).

This fact is clearly understood from FIG. 10 which indicates the comparison between the ion conductivity of the oxide ion conductor 10 in the c-axis direction according to the embodiment of the present invention having the X-ray diffraction measurement profile as shown in FIG. 8 and the respective ion conductivities of the conventional oxide ion conductor as shown in FIG. 9 and yttria-stabilized zirconia (YSZ). That is, it is clearly understood from FIG. 10 that the oxide ion conductor 10 according to the embodiment of the present invention exhibits the excellent ion conductivity over the entire temperature region.

The embodiment of the present invention has been explained as exemplified by the case in which the crystal grains are oriented in the c-axis direction along lines of magnetic force. However, the crystal orientation is not specifically limited thereto. The crystal grains may be oriented in any direction irrespectively of lines of magnetic force provided that the anisotropy arises in the oxide ion conductivity.

In the embodiment described above, the mixed powder is obtained by mixing the $La_2O_3$ powder and the $SiO_2$ powder. However, a mixed powder may be obtained by using powders of substances other than the oxide, for example, such that a carbonate salt of lanthanum and a carbonate salt of silicon are mixed with each other. It is also a matter of course in this case that the ratio of the respective powders should be adjusted so that $La_XSi_6O_{1.5X+12}$, in which X is not less than 8 and not more than 10.

Other rare earth elements and/or trivalent elements may be used in place of La. Part of the elements A may be replaced with bivalent or univalent elements. Ge or other tetravalent elements may be used in place of Si. In the case of Ge, the sintering temperature can be low, i.e., about 1500° C. as compared with Si.

The oxide ion conductor of the present invention is not limited to a conductor having the apatite type structure. It is also possible to use an oxide ion conductor having in the crystal thereof a conduction plane or a conduction direction in which the oxide ion is movable, and showing anisotropy in relation to the oxide ion conductivity. For example, layered perovskite compounds or a series of oxide ion conductors referred to as "BIMEVOX" having a basic composition of $Bi_4V_2O_{11}$ can be used.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. An oxide ion conductor comprising
   a composite oxide which has constituent elements of a trivalent element A, a tetravalent element B, and oxygen O, said composite oxide has a composition formula represented by $A_XB_6O_{1.5X+12}$ provided that $8 \leq X \leq 10$, and said composite oxide has an apatite type crystalline structure;
   wherein said crystal of said composite oxide has a hexagonal system, wherein said hexagonal system has magnetic susceptibilities in the a-axis direction and in the b-axis direction that are different from the magnetic susceptibility in the c-axis direction;
   said oxide ion conductor has anisotropy in the oxide ion conductivity;
   said oxide ion conductor is formed of a sintered product which is formed from excessively advanced grain growth, and
   directions of orientation of a crystal in said sintered product are oriented in a c-axis direction, wherein the oxide ion conductivity along the c-axis direction is greater than the oxide ion conductivity along the a-axis direction and the oxide ion conductivity along the b-axis direction.

2. The oxide ion conductor according to claim 1, wherein a space group of said crystal is expressed as $P6_3/m$ by a Hermann-Mauguin's symbol.

3. The oxide ion conductor according to claim 1, wherein said element A is a rare earth element.

4. The oxide ion conductor according to claim 3, wherein said element A is La.

5. The oxide ion conductor according to claim 3, wherein said element B is Si or Ge.

6. The oxide ion conductor according to claim 4, wherein said element B is Si or Ge.

7. The oxide ion conductor according to claim 4, wherein X=9.33.

8. The oxide ion conductor according to claim 6, wherein X=9.33.

* * * * *